(12) United States Patent
Virnich et al.

(10) Patent No.: US 10,118,522 B2
(45) Date of Patent: Nov. 6, 2018

(54) COMBINED HEATING AND CAPACITIVE SEAT OCCUPANT SENSING SYSTEM

(75) Inventors: Michael Virnich, Korlingen (DE); David Hoyer, Ayl (DE); Martin Thinnes, Trierweiler (DE); Micheal Puetz, Trier (DE); Thomas Meyers, Bitburg (DE); Laurent Lamesch, Lamadelaine (LU)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 769 days.

(21) Appl. No.: 13/542,420

(22) Filed: Jul. 5, 2012

(65) Prior Publication Data
US 2013/0069673 A1    Mar. 21, 2013

(30) Foreign Application Priority Data
Sep. 21, 2011    (LU) .......................................... 91873

(51) Int. Cl.
| | | |
|---|---|---|
| G01R 27/26 | (2006.01) | |
| B60N 2/56  | (2006.01) | |
| B60N 2/00  | (2006.01) | |
| B60R 21/015 | (2006.01) | |

(52) U.S. Cl.
CPC .......... B60N 2/5685 (2013.01); B60N 2/002 (2013.01); B60R 21/0154 (2014.10); B60R 21/01532 (2014.10)

(58) Field of Classification Search
CPC .......... B60R 21/0154; B60R 21/01532; B60R 21/015; B60R 21/01566; B60N 2/5685
USPC ................ 219/496, 202, 203, 204; 324/686; 297/180.12
See application file for complete search history.

(56) References Cited

U.S. PATENT DOCUMENTS

| | | | | |
|---|---|---|---|---|
| 4,029,937 A | * | 6/1977 | Russell ......................... | 392/318 |
| 4,377,733 A | * | 3/1983 | Yamaguchi et al. ........... | 219/713 |
| 4,603,306 A | * | 7/1986 | Kleinberg ........................ | 331/66 |
| 4,860,602 A | * | 8/1989 | Hines et al. .................. | 73/865.9 |
| 5,321,235 A | * | 6/1994 | Makino et al. ................ | 219/716 |
| 6,112,580 A | * | 9/2000 | Hesky ............................. | 73/49.1 |
| 6,161,070 A |   | 12/2000 | Jinno et al. | |
| 6,392,542 B1 |   | 5/2002 | Stanley | |
| 6,703,845 B2 |   | 3/2004 | Stanley et al. | |
| 7,521,940 B2 |   | 4/2009 | Koch et al. | |
| 8,500,194 B2 | * | 8/2013 | Fischer .................. | B60N 2/002 |
| | | | | 297/180.1 |

(Continued)

FOREIGN PATENT DOCUMENTS

| | | | | |
|---|---|---|---|---|
| EP | 2325060 A2 | * | 5/2011 | ............. B60N 2/002 |
| WO | 92/17344 A1 | | 10/1992 | |
| WO | 95/13204 A1 | | 5/1995 | |

OTHER PUBLICATIONS

Joshua R. Smith, et al. "Electric Field Sensing for Graphical Interfaces", IEEE Computer Graphics I/O Devices, May/Jun. 1998, pp. 54-60.

*Primary Examiner* — Jimmy Chou
(74) *Attorney, Agent, or Firm* — Reising Ethington P.C.

(57) ABSTRACT

A combined heating and capacitive seat occupant sensing system comprises a common mode choke configured so as to satisfy at least one of a plurality of conditions, which is taken into account by a decision unit of the system in such a way that an influence of the common mode choke on the decision is compensated.

18 Claims, 12 Drawing Sheets

(56) References Cited

U.S. PATENT DOCUMENTS

| | | | |
|---|---|---|---|
| 9,764,669 B2* | 9/2017 | Lamesch | B60N 2/002 |
| 2003/0189432 A1* | 10/2003 | Montreuil | 324/649 |
| 2008/0319616 A1* | 12/2008 | Federspiel et al. | 701/45 |
| 2009/0164070 A1* | 6/2009 | Yamanaka et al. | 701/45 |
| 2009/0267622 A1* | 10/2009 | Hansen et al. | 324/684 |
| 2009/0295199 A1 | 12/2009 | Kincaid et al. | |
| 2009/0295411 A1* | 12/2009 | Hansen | 324/681 |
| 2010/0084551 A1* | 4/2010 | Kawato | 250/287 |
| 2010/0207560 A1* | 8/2010 | Itoh et al. | 318/400.25 |
| 2011/0121618 A1 | 5/2011 | Fischer et al. | |
| 2011/0148648 A1* | 6/2011 | Fischer et al. | 340/686.6 |
| 2012/0086525 A1* | 4/2012 | Dove | 333/22 R |
| 2013/0015863 A1* | 1/2013 | Lamesch et al. | 324/663 |

* cited by examiner

COMBINED HEATING AND CAPACITIVE SEAT OCCUPANT SENSING SYSTEM

TECHNICAL FIELD

The present invention generally relates to a capacitive seat occupant sensing system that uses a heating element as its antenna electrode. A combined heating and capacitive seat occupant sensing system as proposed herein may e.g. be used for detecting the absence or presence of an occupant on a car seat.

BACKGROUND ART

A capacitive sensor, called by some electric field sensor or proximity sensor, designates a sensor, which generates a signal responsive to the influence of what is being sensed (a person, a part of a person's body, a pet, an object, etc.) upon an electric field. A capacitive sensor generally comprises at least one antenna electrode, to which is applied an oscillating electric signal and which thereupon emits an electric field into a region of space proximate to the antenna electrode, while the sensor is operating. The sensor comprises at least one sensing electrode at which the influence of an object or living being on the electric field is detected. In some (so-called "loading mode") capacitive occupancy sensors, the one or more antenna electrodes serve at the same time as sensing electrodes. In this case, the measurement circuit determines the current flowing into the one or more antenna electrodes in response to an oscillating voltage being applied to them. The relationship of voltage to current yields the complex impedance of the one or more antenna electrodes. In an alternative version of capacitive sensors ("coupling mode" capacitive sensors), the transmitting antenna electrode(s) and the sensing electrode(s) are separate from one another. In this case, the measurement circuit determines the current or voltage that is induced in the sensing electrode when the transmitting antenna electrode is operating.

The different capacitive sensing mechanisms are explained in the technical paper entitled "Electric Field Sensing for Graphical Interfaces" by J. R. Smith, published in Computer Graphics I/O Devices, Issue May/June 1998, pp 54-60. The paper describes the concept of electric field sensing as used for making non-contact three-dimensional position measurements, and more particularly for sensing the position of a human hand for purposes of providing three dimensional positional inputs to a computer. Within the general concept of capacitive sensing, the author distinguishes between distinct mechanisms he refers to as "loading mode", "shunt mode", and "transmit mode" which correspond to various possible electric current pathways. In the "loading mode", an oscillating voltage signal is applied to a transmit electrode, which builds up an oscillating electric field to ground. The object to be sensed modifies the capacitance between the transmit electrode and ground. In the "shunt mode", an oscillating voltage signal is applied to the transmit electrode, building up an electric field to a receive electrode, and the displacement current induced at the receive electrode is measured, whereby the displacement current may be modified by the body being sensed. In the "transmit mode", the transmit electrode is put in contact with the user's body, which then becomes a transmitter relative to a receiver, either by direct electrical connection or via capacitive coupling. "Shunt mode" is alternatively referred to as the above-mentioned "coupling mode".

Capacitive occupant sensing systems have been proposed in great variety, e.g. for controlling the deployment of one or more airbags, such as e.g. a driver airbag, a passenger airbag and/or a side airbag. U.S. Pat. No. 6,161,070, to Jinno et al., relates to a passenger detection system including a single antenna electrode mounted on a surface of a passenger seat in an automobile. An oscillator applies on oscillating voltage signal to the antenna electrode, whereby a minute electric field is produced around the antenna electrode. Jinno proposes detecting the presence or absence of a passenger in the seat based on the amplitude and the phase of the current flowing to the antenna electrode. U.S. Pat. No. 6,392,542, to Stanley, teaches an electric field sensor comprising an electrode mountable within a seat and operatively coupled to a sensing circuit, which applies to the electrode an oscillating or pulsed signal "at most weakly responsive" to wetness of the seat. Stanley proposes to measure phase and amplitude of the current flowing to the electrode to detect an occupied or an empty seat and to compensate for seat wetness.

The idea of using the heating element of a seat heater as an antenna electrode of a capacitive occupancy sensing system has been known for a long time. WO 92/17344 A1 discloses a an electrically heated vehicle seat with a conductor, which can be heated by the passage of electrical current, located in the seating surface, wherein the conductor also forms one electrode of a two-electrode seat occupancy sensor.

WO 95/13204 discloses a similar system, in which the oscillation frequency of an oscillator connected to the heating element is measured to derive the occupancy state of the vehicle seat.

U.S. Pat. No. 7,521,940 relates to a combined seat heater and capacitive sensor capable of operating, at a time, either in heating mode or in occupant-sensing mode. The device includes a sensor/heat pad for transmitting a sensing signal, a first diode coupled to a first node of the sensor/heat pad, a second diode coupled to a second node of the sensor/heat pad, a first transistor coupled to the first diode and a second transistor coupled to the second diode. During sensing mode, the first and second transistors are opened and the nodes between the first transistor and the first diode, as well as between the second transistor and the second diode are reverse-biased to isolate the sensor/heat pad from the power supply of the heating circuit.

US 2009/0295199 discloses a combined seat heater and capacitive sensor, wherein each of the two terminals of the heating element is connected to the heating power supply via two transistors in series. The device may not operate in sensing mode and in heating mode at a time. When the device is in sensing mode, the nodes between each pair of transistors are actively kept at the same potential as the heating element by means of respective voltage followers in order to neutralize any open-switch impedance of the transistors.

The very same idea has already been disclosed in U.S. Pat. No. 6,703,845. As an alternative to transistors, that document discloses inductors to achieve a high impedance at the frequency of the oscillating signal between the heating element and the power source of the heating circuit. As in the previously discussed document, a voltage follower maintains the intermediate nodes substantially at the same potential as the heating element in order to effectively isolate, at the frequency of the oscillating signal, the power supply of the heating circuit from the heating element.

A disadvantage of the system disclosed in U.S. Pat. No. 6,703,845 is that the inductors used as AC-decoupling elements have to support the full heating current (up to 10

A DC and more) and present high AC impedance to the capacitive measurement circuit and the seat heater at the same time. High inductance and high operating DC current implies that the inductor have to be wound on large cores, which are expensive. Depending on the application chosen from U.S. Pat. No. 6,703,845, either two or four of these inductors have to be used.

US 2011/121618 discloses yet another variant of an occupant detection system including a heating element adjacent the seating surface of a seat. A capacitive occupant detection circuit is electrically coupled to the heating element. A common mode choke is interposed between the heating circuit and the heating element as an isolation circuit that prevents the heating circuit from influencing the occupant detection circuit.

An ideal common mode choke would totally suppress flow of AC current. In practice, however, an ideal common mode choke does not exist and there will be a residual alternating current across the common mode choke. Compensating the influence of the residual alternating current on the measurement is complicated because the electrical properties (e.g. inductance and conductance) of common mode chokes are dependent on temperature. As the automotive industry prescribes a temperature range from −40° C. to 150° C., ascertaining the operability of a combined heating and capacitive sensing system using a common mode choke in the entire temperature range is a challenging task.

BRIEF SUMMARY

The present invention provides a combined heating and capacitive seat occupant sensing system configured in such a way as to be able to compensate the influence of the common mode choke on the capacitive measurements in the automotive temperature range.

According to the invention, a combined heating and capacitive seat occupant sensing system comprises
- a heating element (a conductive wire, cable, fibre, bundle of fibres, a conductive track printed on a flexible, e.g. plastic, substrate, or the like) for producing heat when an electrical current is caused to flow across it;
- a capacitive sensing circuit connected to the heating element so as to be able to use the heating element as an antenna electrode, and
- a common mode choke connected to the terminals of the heating element for DC-coupling the heating element to a heating current supply and for suppressing (mitigating as much as possible) alternating current flow between the heating element and the heating current supply.

The capacitive sensing circuit is configured for driving a first and a second alternating current at a first and a second frequency, respectively, into the heating element. The capacitive sensing circuit includes a decision unit for deciding whether a seat occupant is present or not and for producing an output signal indicative of the decision. The first and second frequencies, hereinafter referred to as $f_1$ and $f_2$, respectively, are comprised in the range from 50 kHz to 10 MHz, with $f_1$ and $f_2$ spaced from each other by at least 10 kHz.

The common mode choke is configured so as to satisfy at least one of the following conditions:

a)

$$-5\% \leq \frac{[K_{REAL}(f_1, f_2, T) - K_{REAL}(f_1, f_2, T_{REF})]}{K_{REAL}(f_1, f_2, T_{REF})} \leq 5\%,$$

for any temperature T in the range from −40° C. to +150° C.,
where $T_{REF}=25°$ C. and where the function $K_{REAL}(f_x, f_y, T)$ is defined as the ratio $G(f_y,T)/G(f_x,T)$, where $G(f_x,T)$ and $G(f_y,T)$ is the conductance, at temperature T, of the common mode choke at a frequency $f_x$ and $f_y$, respectively;

b)

$$-3\% \leq \frac{[K_{IMAG}(f_1, f_2, T) - K_{IMAG}(f_1, f_2, T_{REF})]}{K_{IMAG}(f_1, f_2, T_{REF})} \leq 3\%,$$

for any temperature T in the range from −40° C. to +150° C.,
where $T_{REF}=25°$ C. and where the function $K_{IMAG}(f_x, f_y, T)$ is defined as the ratio $L(f_y,T)/L(f_x,T)$, where $L(f_x,T)$ and $L(f_y,T)$ is the inductance, at temperature T, of the common mode choke at a frequency $f_x$ and $f_y$, respectively;

c)

$$-20\% \leq \frac{[\Delta L(f_1, f_2, T) - \Delta L(f_1, f_2, T_{REF})]}{\Delta L(f_1, f_2, T_{REF})} \leq 20\%,$$

for any temperature T in the range from −40° C. to +150° C.,
where $T_{REF}=25°$ C. and where the function $\Delta L(f_x,f_y,T)$ is defined as the difference $L(f_y,T)-L(f_x,T)$, where $L(f_x,T)$ and $L(f_y,T)$ is the inductance, at a temperature T, of the common mode choke at a frequency $f_x$ and $f_y$, respectively.

The decision unit is configured for deciding whether a seat occupant is present or not based upon the first and second alternating currents while taking into account the condition satisfied by the common mode choke in such a way as to compensate an influence of the common mode choke on the decision.

Advantageously, the conductive wire, cable, fibre, bundle of fibres, track etc. of the heating element is made of a PTC (positive temperature coefficient) material.

The inventors have recognized that the influence of the common mode choke can be compensated by combining measurements of alternating current, complex impedance and/or complex admittance made at at least two frequencies, if the common mode choke has at least one of the properties defined herein by conditions a), b) and c). An interesting advantage of the invention is that it is not necessary to measure the temperature of the common mode choke and to carry out a compensation based on the temperature measurement. Thanks to the choice of the common mode choke, the dependence on temperature is automatically taken into account.

Preferably, at least one of the frequencies is selected in the range from 50 kHz to 400 kHz. As those skilled will appreciate, at frequencies in this range, the measured current notably depends on whether the seat is wet or dry. Accordingly, if at least one of the frequencies is chosen in that range, it is possible to compensate the influence of a wet seat on the occupancy state output by the decision unit.

According to preferred embodiments of the invention, the common mode choke is configured so as to satisfy at least condition a). Preferably, the common mode choke is configured so as to satisfy $$-2\% \leq \frac{[K_{REAL}(f_1, f_2, T) - K_{REAL}(f_1, f_2, T_{REF})]}{K_{REAL}(f_1, f_2, T_{REF})} \leq 2\%$$

for any temperature T in the range from −40° C. to +150° C. Preferably, in addition to condition a), the common mode choke also satisfies condition b) or c).

Advantageously, condition b) is limited to $$-2\% \leq \frac{[K_{IMAG}(f_1, f_2, T) - K_{IMAG}(f_1, f_2, T_{REF})]}{K_{IMAG}(f_1, f_2, T_{REF})} \leq 2\%,$$

for any temperature T in the range from −40° C. to +150° C. Advantageously, condition c) is limited to $$-10\% \leq \frac{[\Delta L(f_1, f_2, T) - \Delta L(f_1, f_2, T_{REF})]}{\Delta L(f_1, f_2, T_{REF})} \leq 10\%$$

for any temperature T in the range from −40° C. to +150° C.

An aspect of the present invention concerns a combined heating and capacitive seat occupant sensing system comprising a heating current supply (e.g. a power supply and a temperature control unit) that is DC-coupled to the heating element via the common mode choke.

Yet another aspect of the invention concerns a vehicle seat comprising a combined heating and capacitive seat occupant sensing system as described herein.

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

Existing capacitive sensing systems used in the automotive industry determine the capacitance between a sensing element in the seat and AC-GND of the vehicle. The value of this capacitance depends on the occupancy status and on the environmental condition (e. g. humidity/water in the seat). Depending on the absolute value of the measured capacitance, the seat is classified as being occupied by a person (high capacitance value), or it is classified as being not occupied or occupied by a child seat (low capacitance value). In the first case, the airbag is activated and deploys in case of a crash. In the second case, the airbag is deactivated and does not deploy in case of a crash in order to protect a possible child in a child seat.

Water in or on the seat generates an increase of the imaginary part of the alternating current (i.e. the current component that is 90° out of phase with the alternating voltage). If only the imaginary part of the alternating current is measured, which reflects an increase in capacitance seen by the sensing electrode, may lead to a misclassification of a child seat placed on the passenger. In that case, the airbag would deploy in case of a crash and possibly harm the child.

Figure 1:
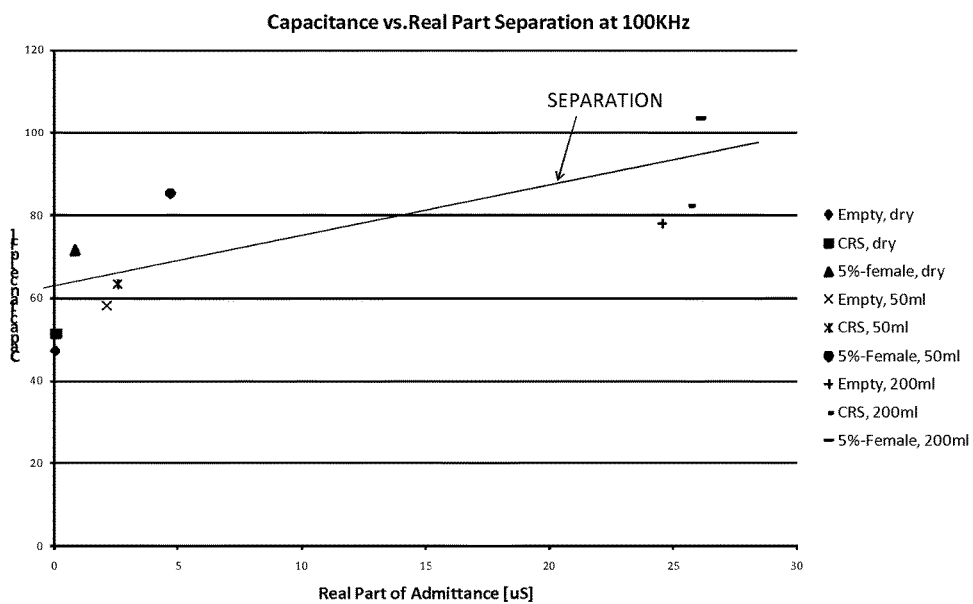
FIG. 1 illustrates the separation between 'EmptySeat'/'CRS' occupancy state and 5%-Female occupancy state by evaluation of capacitance and real part of admittance at 100 KHz.

Since a wet seat also increases the real part of the alternating current (i.e. that current component that it in phase with the alternating voltage), this real part can be used to adapt the threshold for the imaginary part, above which the seat is assessed as being occupied. FIG. 1 shows an example for development of the capacitance and the real part of the complex admittance in dry seat and wet seat (50 mL, 200 mL of water) condition. In addition, the separation threshold between 'EmptySeat/CRS' and 5%-female is shown.

In order to ensure proper classification of the occupancy situation under different environmental conditions, the measurement accuracy of the sensing system has to be sufficient to ensure the correct determination of the capacitive value as well as the real part (conductance) of the complex admittance seen by the sensing electrode in the seat.

Figure 2:
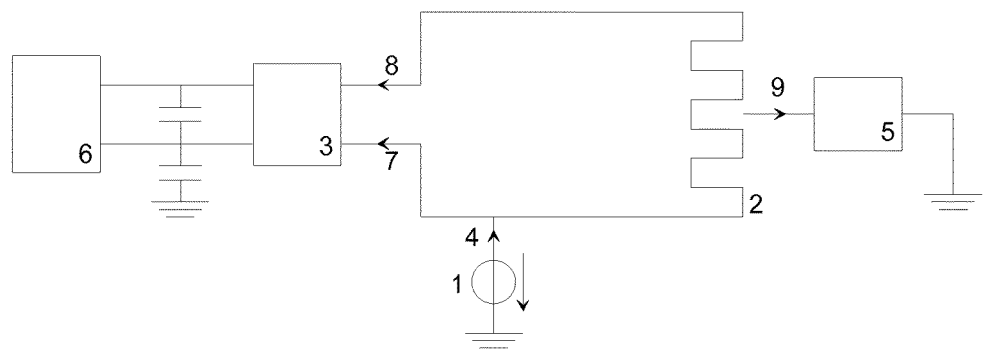
FIG. 2 is a schematic illustration of a capacitive sensing system using the seat heater as sensing element

Referring to FIG. 2, which shows the basic structure of a capacitive measurement system using the seat heater as sensing element, 1 is the voltage source
2 is a seat heating element
3 is an AC decoupling element
4 is the measurement current
5 is the complex impedance/admittance representing the occupancy situation
6 the seat heater control unit.
7 is a current flowing through decoupling element to AC GND
8 is a current flowing through decoupling element to AC GND
9 is the current flowing via 5 to GND.

A voltage 1 with fixed or variable frequency is applied to the seat heating element 2 which is decoupled from the vehicle's AC-GND respectively the seat heater control unit 6 by the AC decoupling element 3. The measurement current 4 splits up into the currents 7, 8 and 9. Current 9 flows through the complex impedance/admittance 5 and carries the information about the occupancy status on the seat. Currents 7 and 8 flow directly to AC GND via the non-ideal decoupling element 3. The evaluation of the amplitude and phase angle of the alternating current 4 is used to determine the occupancy situation on and environmental condition in the seat by performing the comparison between measured signal and predetermined relation between measurement signals and different occupancy situations under different environmental conditions.

The drawback of such an approach is that the measurement system's performance depends on the tolerances of its components and their susceptibility against influences like temperature, aging etc. Especially, parasitic parameters, which are hard to control, and their variations can cause a degradation of performance. A preferred embodiment of the AC decoupling element 3 in FIG. 2 is a common mode choke.

Figure 3:
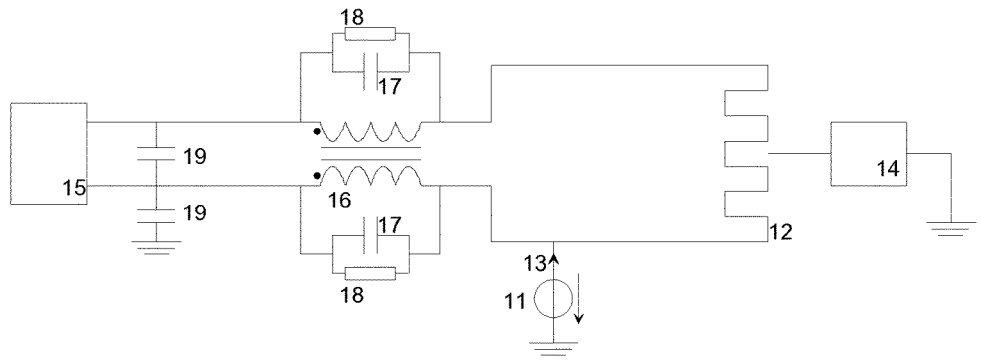
FIG. 3 is a schematic illustration of a capacitive sensing system using the seat heater as sensing element, wherein the heating current supply is AC-decoupled from the heating element by a common mode choke.

Referring to FIG. 3,
11 is the voltage source
12 is a seat heating element
13 is the measurement current
14 is the complex impedance/admittance representing the occupancy situation
15 the seat heater control unit.
16 is a common mode choke
17 are parasitic capacitances
18 are parasitic parallel resistances
19 are GND coupling capacitors.

The common mode choke 16 generates a parallel complex load to the complex impedance/admittance 14, which represents the occupancy situation and the environmental condition in the seat. The common mode choke exhibits parasitic capacitances and parallel resistances, illustrated as items 17 and 18. As the parallel complex load of the common mode choke is susceptible to environmental influences (mainly temperature), the ability of the system to determine the correct occupancy status degrades with the use of such components in existence of these environmental conditions, if no countermeasures are taken. The main reason for this fact is that the magnetic core properties of the common mode choke 16 vary over production, temperature and other influences.

The parasitic capacitances 17 remain virtually constant over temperature, since they depend only on temperature invariant parameters, like the number of windings, the used winding technique, the wire diameter etc. In contrast to that, the common mode inductance value of choke 16, which is responsible for the decoupling of the sensing circuit from the vehicle's GND, can heavily vary over temperature and other environmental influences. In the same way, the parallel resistances 18 may vary over temperature.

Since both the inductance and parallel resistances dominate the overall complex impedance/admittance seen by the sensing electrode 12, the real and imaginary part of the measurement current 13, which is the subject of the evaluation, mainly depends on the inductance and the parallel resistances including their variation over environmental influences, and depends only very little on the complex impedance/admittance 14. Therefore, in order to ensure the required accuracy for the measurement of the capacitance and conductance of 14, the influences of the parallel resistances, the common mode inductance and the parasitic parallel capacitances 17 have to be taken into account or compensated.

The absolute values of the inductance, parallel resistances and parallel capacitances 17 can be measured and used for system calibration at a given environmental condition, e. g. at room temperature. The variation of the inductance and of the parallel resistances can be either compensated by very costly calibration over all relevant environmental conditions (e. g. ambient temperature) combined with the use of a sensing device to determine the environmental condition (e. g. use of a thermo couple to sense the ambient temperature) or they need to be compensated by other techniques. The present invention follows a different approach.

Figure 4:
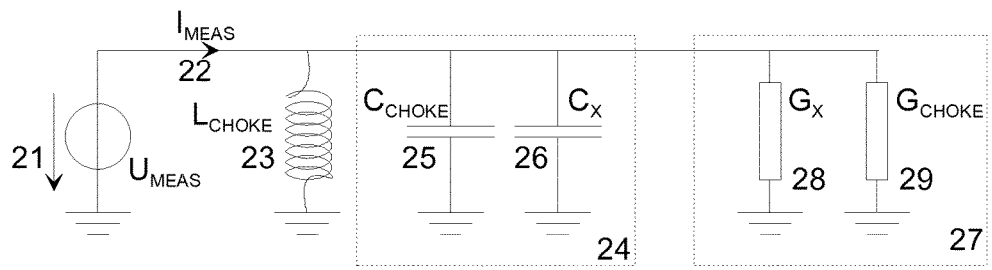
FIG. 4: is an equivalent circuit diagram of the system of FIG. 3.

FIG. 4 shows the equivalent circuit of a system exemplified by FIG. 3. Referring to FIG. 4,
21 is a voltage source
22 is the complex current measured
23 is the common mode inductance
24 is the overall capacitance to GND
25 is the system's inherent capacitance to GND, mainly determined by the choke's parasitic capacitance to GND
26 is the seat's capacitance to GND seen by the sensing electrode (to be determined by the sensing system)
27 is the overall conductance to GND
28 is the seat's conductance to GND seen by the sensing electrode (to be determined by the sensing system)
29 is the inherent system conductance to GND, mainly determined by losses in the common mode choke.

The voltage source 21 generates a measurement voltage at one or several measurement frequencies. Upon application of the voltage, a complex current 22 flows into the heating element. This current is measured (e.g. using a current meter). Its phase angle and amplitude respectively its real part and its imaginary part depend on the complex load connected to the voltage source 21. The complex load can be described as an overall capacitance 24 to GND in parallel to the common mode inductance 23 in parallel to an overall conductance 27 to GND. Both inductance 23 and capacitance 24 are responsible for the generation of the imaginary part of the complex measurement current 22. The real part of the complex measurement current is determined by the overall conductance 27.

The overall capacitance 24 is the sum of the sensing system's inherent capacitance 25 to GND and the capacitance 26 to GND seen be the sensing element in the seat. The system's inherent capacitance 25 to GND, to which mainly the choke's parasitic parallel capacitance contributes, is virtually constant and not depending on environmental influence and can therefore be compensated without problems.

The overall conductance 27 is the sum of the sensing system's inherent conductance 29 to GND generated by the common mode choke and the conductance 29 to GND determined by the sensing element in the seat.

The value of the inductance 23 and the overall conductance 27 vary over temperature and frequency since the real part and imaginary part of the permeability of the choke's core material are dependent on temperature and frequency.

In the following, it will be described how the capacitance CX and the conductance GX can be determined when common mode chokes are used that satisfy condition a), b) or c) mentioned hereinabove. The properties of the common mode choke allow compensating the system inherent frequency and temperature depending variation described above. If these variations remained uncompensated, they would degrade the sensing system's performance to correctly classify the occupancy situation on the seat. The compensation is effected by measuring the complex current resulting upon application of alternating voltage at a first and a second frequency. The first and second frequencies, referred to as $f_1$ and $f_2$, respectively, are comprised in the range from 50 kHz to 10 MHz, with $f_1$ and $f_2$ spaced from each other by at least 10 kHz.

The following notations are used:

$$K_{REAL}(f_x, f_y, T) = \frac{G(f_y, T)}{G(f_x, T)}$$

where $G(f_x,T)$ and $G(f_y,T)$ is the conductance, at temperature T, of the common mode choke at a frequency $f_x$ and $f_y$, respectively.

$$K_{IMAG}(f_x, f_y, T) = \frac{G(f_y, T)}{G(f_x, T)}$$

where $L(f_x,T)$ and $L(f_y,T)$ is the inductance, at temperature T, of the common mode choke at a frequency $f_x$ and $f_y$, respectively.

$$\Delta L(f_x, f_y, T) = L(f_y, T) - L(f_x, T)$$

where $L(f_x,T)$ and $L(f_y,T)$ is the inductance, at a temperature T, of the common mode choke at a frequency $f_x$ and $f_y$, respectively.

Embodiment 1

According to the first embodiment of the invention, condition b) is satisfied. This means that function $K_{IMAG}(f_x, f_y, T)$ may be considered approximately independent on temperature. Setting $K_{IMAG}(f_x,f_y,T)=K_{IMAG}(f_1,f_2,T_{REF})$ with e.g. $T_{REF}=25°$ C., the dependency on temperature may be omitted.

From $L(f_2,T)=K_{IMAG}(f_1,f_2) \cdot L(f_1,T)$ over all relevant temperatures ($-40°$ C.$\leq T \leq 150°$ C.), it can be concluded that the inductance curve over temperature and frequency meets the relation $$L(f,T) = K_L(T-T_{REF}) \cdot L(f,T_{REF})$$

with f representing a measurement frequency in the range from $f_1$ to $f_2$, and $K_L$ the temperature coefficient of inductance (constant over frequency). This may be shown as follows. Since $L(f_2,T)=K_{IMAG}(f_1,f_2) \cdot L(f_1,T)$ and $L(f_2,T_{REF})=K_{IMAG}(f_1,f_2) \cdot L(f_1,T_{REF})$:

$$\rightarrow \frac{L(f_2, T)}{L(f_2, T_{REF})} = \frac{L(f_1, T)}{L(f_1, T_{REF})} = K_L(T - T_{REF})$$

$$\leftrightarrow L(f_2, T) = K_L(T - T_{REF}) \cdot L(f_2, T_{REF})$$

$$\leftrightarrow L(f, T) = K_L(T - T_{REF}) \cdot L(f, T_{REF}).$$

Figure 5:
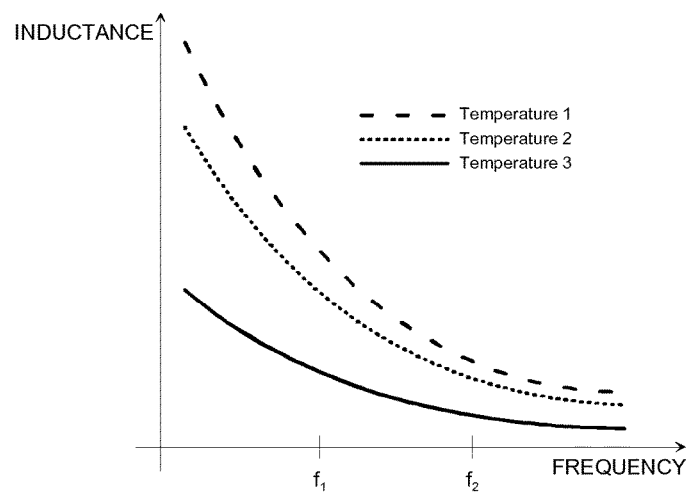
FIG. 5 is a schematic illustration of common mode inductance vs. temperature and frequency, when condition b) is satisfied (KIMAG compensation)

FIG. 5 schematically shows the common mode inductance curves over frequency and temperature suitable to apply the described $K_{IMAG}$-compensation, since all curves are proportional to each other. This means $$L(f,T_1) = K_L(T_1-T_2) \cdot L(f,T_2) = K_L(T_1-T_3) \cdot L(f,T_3).$$

Using the relationship $(f_2,T)=K_{IMAG}(f_1,f_2) \cdot L(f_1,T)$, the dependence on temperature of the inductance can be eliminated by combining measurements of complex current, complex impedance or complex admittance at plural (i.e. at least two) frequencies.

If the inductance of the common mode choke were independent on frequency, the capacitance that contains the information on seat occupancy could be calculated by the formula:

$$C_{X,COMP} = \frac{1}{2\pi} \frac{\frac{I_1}{U_1} \cdot f_1 - \frac{I_2}{U_2} \cdot f_2}{f_1^2 - f_2^2} \quad (0)$$

where $I_1$: imaginary part of measurement current I at first measurement frequency $I_2$: imaginary part of measurement current I at second measurement frequency $U_1$: measurement voltage during measurement at first measurement frequency $U_2$: measurement voltage during measurement at second measurement frequency $f_1$: first measurement frequency $f_2$: second measurement frequency $C_{X,COMP}$: calculated capacitance after compensation of choke influence.

By means of this procedure, the capacitive measurement becomes insensitive against the absolute value and the variation of the inductance e. g. over temperature. However, the inductance value must not change over measurement frequency.

The condition that the inductance of the common mode choke be independent on frequency is not satisfied for the common mode chokes considered for the described capacitive sensing application. FIG. 5 schematically shows the inductance of a common mode choke versus measurement frequency and temperature. It clearly shows that the inductance decreases with rising frequency, which would generate a measurement error if above mentioned formula for $C_{X,COMP}$ were applied.

This error can be quantified by the following enhanced equation:

$$\Delta C_{X,L} = \frac{1}{L_1} \cdot \frac{\frac{1}{1+\frac{L_2-L_1}{L_1}}-1}{(2\pi)^2 \cdot (f_1^2 - f_2^2)}$$

where:
$L_1$: common mode inductance at first measurement frequency
$L_2$: common mode inductance at second measurement frequency
$f_1$: first measurement frequency
$f_2$: second measurement frequency
$\Delta C_{X,L}$: measurement error caused by dependency on frequency of common mode inductance As $\Delta C_{X,L}$ is proportional to $$\frac{1}{L_1}$$

and $L_1$ is dependent on temperature, the measurement error $\Delta C_{X,L}$ is also dependent on temperature. Therefore, a compensation of the inductance absolute value and its variation over temperature cannot be achieved by above-mentioned approach if the inductance value is depending on the measurement frequency.

Using $L(f_2,T)=K_{IMAG}(f_1,f_2)\cdot L(f_1,T)$, it follows from $$\frac{I_1}{U_1} = 2\pi f_1 C(f_1) - \frac{1}{2\pi f_1 L(f_1, T)}$$

and $$\frac{I_2}{U_2} = 2\pi f_2 C(f_2) - \frac{1}{2\pi f_2 L(f_2, T)}$$

that the formula for $C_{X,COMP}$ becomes:

$$C_{X,COMP} = \frac{1}{2\pi} \frac{\frac{I_1}{U_1} \cdot f_1 - K_{IMAG}(f_1, f_2) \cdot \frac{I_2}{U_2} \cdot f_2}{f_1^2 - K_{IMAG}(f_1, f_2) \cdot f_2^2}. \quad (*)$$

When C is dependent on frequency (which cannot totally be excluded, since the equivalent circuit diagram of FIG. 4 may be not entirely accurate for all situations, e.g. a wet seat), $C_{X,COMP}$ represents:

$$\frac{f_1^2 C(f_1) - K_{IMAG}(f_1, f_2) \cdot f_2^2 \cdot C(f_2)}{f_1^2 - K_{IMAG}(f_1, f_2) \cdot f_2^2} = C_{X,COMP}.$$

For a dry seat, where the overall capacitive value does not depend on the measurement frequency, $C_{X,COMP}$ is:

$$C_{X,COMP} = \frac{f_1^2 C_{DRY} - K_{IMAG}(f_1, f_2) \cdot f_2^2 C_{DRY}}{f_1^2 - K_{IMAG}(f_1, f_2) \cdot f_2^2}$$

$$= C_{DRY} \cdot \frac{f_1^2 - K_{IMAG}(f_1, f_2) \cdot f_2^2}{f_1^2 - K_{IMAG}(f_1, f_2) \cdot f_2^2}$$

$$= C_{DRY}$$

This means that in the 'dry' case, the calculated value $C_{X,COMP}$ is equal to the overall capacitance C. In case of a wet seat, $C_{X,COMP}$ represents the result of the transformation of the overall capacitance C at the first and the second measurement frequency.

If $K_{IMAG}$ depends on the temperature, this leads to a compensation error in $C_{X,COMP}$, i.e. to an error that adds to the in the result of the described transformation. The error can be calculated as:

$$\Delta C_{X,COMP}(f_1, f_2, T) = \frac{1}{(2\pi)^2 \cdot L(f_1, T)} \cdot \frac{1 - \frac{1}{1+\frac{\Delta K_{IMAG}}{K_{IMAG}(f_1, f_2, T_{REF})}}}{f_1^2 - K_{IMAG}(f_1, f_2, T_{REF}) \cdot f_2^2} =$$

$$\frac{1}{(2\pi)^2 \cdot L(f_1, T)} \cdot \frac{1 - \frac{1}{1+\frac{K_{IMAG}(f_1, f_2, T) - K_{IMAG}(f_1, f_2, T_{REF})}{K_{IMAG}(f_1, f_2, T_{REF})}}}{f_1^2 - K_{IMAG}(f_1, f_2, T_{REF}) \cdot f_2^2}$$

where $\Delta C_{X,COMP}(f_1,f_2,T)$ represents the compensation error due to the temperature dependency of $K_{IMAG}$. When condition b) is satisfied, $C_{X,COMP}(f_1,f_2,T)$ may be neglected.

A combined heating and seat occupant sensing system according to embodiment 1 (the common mode choke of which satisfies condition b)) is typically configured to measure (at least) the imaginary part of the alternating current I at the first measurement frequency and the imaginary part of alternating current I at the second measurement frequency. The capacitive sensing circuit then computes $C_{X,COMP}$ using formula (*). The decision unit then compares $C_{X,COMP}$ with a threshold $C_{TH}$. If $C_{X,COMP} > C_{TH}$, than the seat is deemed occupied (by a 5% female or a heavier occupant). If $C_{X,COMP} < C_{TH}$, than the seat is deemed not occupied (or occupied by a child seat). The capacitive sensing circuit is preferably implemented as an ASIC, a FPGA, a microcontroller or the like. In order to take into account possible seat wetness, the threshold $C_{TH}$ may be dependent on the real parts of the alternating currents measured.

Embodiment 2

According to the second embodiment of the invention, condition c) is satisfied. This means that function $\Delta L(f_x,f_y,T)$ may be considered approximately independent on temperature. Setting $\Delta L(f_x,f_y,T)=\Delta L(f_x,f_y,T_{REF})$ with e.g. $T_{REF}=25°$ C., the dependency on temperature may be omitted.

From $L(f_2,T)=L(f_1,T)+\Delta L(f_1,f_2)$ over all relevant temperatures ($-40°$ C.$\leq$T$\leq$150° C.), the influence of the absolute value of the inductance and its variation over temperature can be fully compensated.

Starting from the results of the current measurements at both measurement frequencies $$I_1 = U_1\left(-\frac{1}{2\pi f_1 L(f_1,T)} + 2\pi f_1 C_X\right) \leftrightarrow \frac{1}{L(f_1,T)} =$$

$$-2\pi f_1 \frac{I_1}{U_1} + (2\pi f_1)^2 C_X \leftrightarrow L(f_1,T) = \frac{1}{-2\pi f_1 \frac{I_1}{U_1} + (2\pi f_1)^2 C_X}$$

and $$I_2 = U_2\left(-\frac{1}{2\pi f_2 L(f_2,T)} + 2\pi f_2 C_X\right) \leftrightarrow \frac{1}{L(f_2,T)} =$$

$$-2\pi f_2 \frac{I_2}{U_2} + (2\pi f_2)^2 C_X \leftrightarrow L(f_2,T) = \frac{1}{-2\pi f_2 \frac{I_2}{U_2} + (2\pi f_2)^2 C_X}$$

and taking above mentioned requirement $L(f_2,T)=L(f_1,T)+\Delta L(f_1,f_2)$ into consideration, one obtains $$\frac{1}{-2\pi f_2 \frac{I_2}{U_2} + (2\pi f_2)^2 C_X} = \frac{1}{-2\pi f_1 \frac{I_1}{U_1} + (2\pi f_1)^2 C_X} + \Delta L(f_1,f_2)$$

In that case the capacitance $C_X$ can be calculated by the following formula:

$$C_X = -\frac{p}{2} \pm \sqrt{\frac{p^2}{4} - q} \quad (**)$$

with $$p = -\frac{1}{(2\pi)^2} \frac{f_1^2 - f_2^2 + \Delta L(f_1,f_2) \cdot 2\pi f_1 f_2\left(\frac{I_1}{U_1}f_2 + \frac{I_2}{U_2}f_1\right)}{\Delta L(f_1,f_2) \cdot f_1^2 f_2^2}$$

$$q = -\frac{1}{(2\pi)^2} \frac{\left(\frac{I_2}{U_2}f_2 - \frac{I_1}{U_1}f_1 - \Delta L(f_1,f_2) \cdot 2\pi f_1 f_2 \frac{I_1 I_2}{U_1 U_2}\right)}{\Delta L(f_1,f_2) \cdot f_1^2 f_2^2}.$$

Depending on the sign of $\Delta L(f_1,f)=L(f_2)-L(f_1)$, $C_X$ has to be calculated as follows:
If $\Delta L(f_1,f_2)<0$, use:

$$C_X = -\frac{p}{2} - \sqrt{\frac{p^2}{4} - q}$$

If $\Delta L(f_1,f_2)>0$, use:

$$C_X = -\frac{p}{2} + \sqrt{\frac{p^2}{4} - q}.$$

Figure 6:
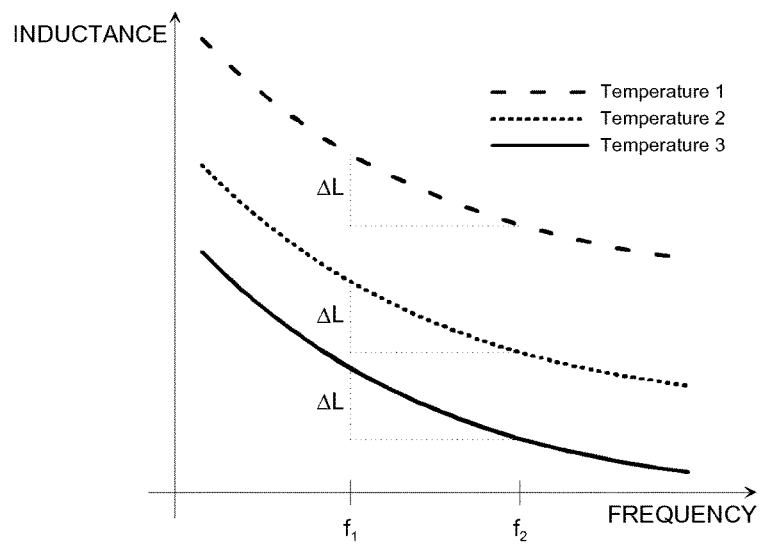
FIG. 6 is a schematic illustration of common mode inductance vs. temperature and frequency, when condition c) is satisfied (ΔL compensation)

FIG. 6 schematically shows the common mode inductance curve over frequency and temperature suitable to apply the described $\Delta L$-compensation. All curves are virtually identical in shape, but parallel shifted due to temperature influence. Due to these parallel shifts, the absolute difference between $L(f_1,T)$ and $L(f_2,T)$ remains the same over frequency.

A combined heating and seat occupant sensing system according to embodiment 2 (the common mode choke of which satisfies condition c)) is typically configured to measure (at least) the imaginary part of the alternating current I at the first measurement frequency and the imaginary part of alternating current I at the second measurement frequency. The capacitive sensing circuit then computes $C_X$ using formula (**). The decision unit then compares $C_X$ with a threshold $C_{TH}$. If $C_X>C_{TH}$, than the seat is deemed occupied (by a 5% female or a heavier occupant). If $C_X<C_{TH}$, than the seat is deemed not occupied (or occupied by a child seat). The capacitive sensing circuit is preferably implemented as an ASIC, a FPGA, a microcontroller or the like. In order to take into account possible seat wetness, the threshold $C_{TH}$ may be dependent on the real parts of the alternating currents measured.

Embodiment 3

According to the third embodiment of the invention, condition a) is satisfied. This means that function $K_{REAL}(f_x,f_y,T)$ may be considered approximately independent on temperature. Setting $K_{REAL}(f_x,f_y,T)=K_{REAL}(f_x,f_y,T_{REF})$ with e.g. $T_{REF}=25°$ C., the dependency on temperature may be omitted.

From $G_{CHOKE}(f_2)=K_{REAL}(f_1,f_2)\cdot G_{CHOKE}(f_1)$ over all relevant temperatures ($-40°$ C.$\leq T\leq 150°$ C.), it can be concluded that the conductance curve over temperature and frequency meets the relation $$G(f,T)=K_G(T-T_{REF})\cdot G(f,T_{REF})$$

This may be shown as follows.

$$G(f_2,T)=G_{IMAG}(f_1,f_2)\cdot G(f_1,T) \text{ and } G(f_2,T_{REF})=G_{IMAG}(f_1,f_2)\cdot G(f_1,T_{REF})$$

$$\rightarrow \frac{G(f_2,T)}{G(f_2,T_{REF})} = \frac{G(f_1,T)}{G(f_1,T_{REF})} = K_G(T-T_{REF}) \leftrightarrow G(f_2,T) =$$

$$K_G(T-T_{REF})\cdot G(f_2,T_{REF}) \leftrightarrow G(f,T) = K_G(T-T_{REF})\cdot G(f,T_{REF})$$

Figure 7:
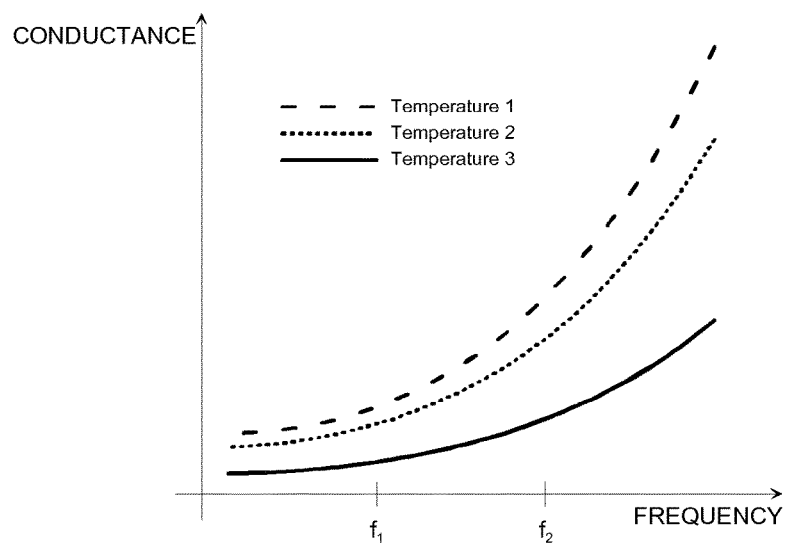
FIG. 7 is a schematic illustration of common mode conductance vs. temperature and frequency, when condition a) is satisfied (KREAL compensation)
Figure 8:
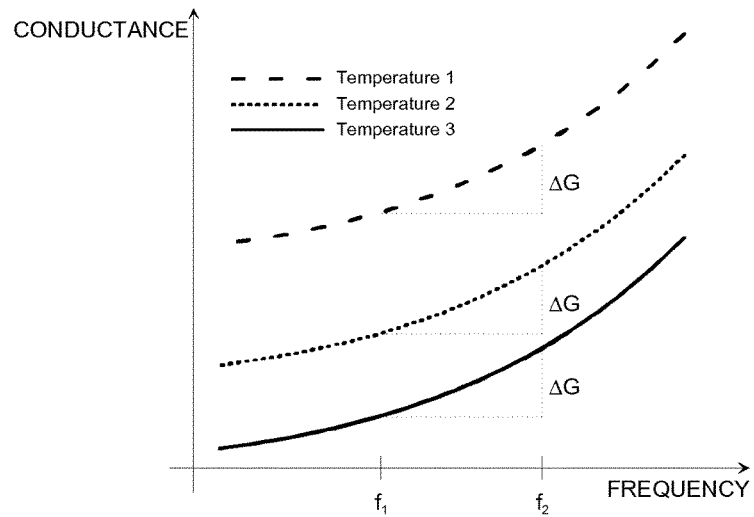
FIG. 8 is a schematic illustration of common mode conductance vs. temperature and frequency when ΔG compensation is applicable.

FIG. 7 schematically shows the common mode parallel conductance to GND curves over frequency and temperature suitable to apply the described $K_{REAL}$-compensation, since all curves are proportional to each other. This is equivalent to:

$$G(f,T_1)=K_{GL}(T_1-T_2)\cdot G(f,T_2)=K_G(T_1-T_3)\cdot G(f,T_3).$$

Denoting with $I_{REAL}(f_1)$ the real part of the measurement current at the first measurement frequency and with $I_{REAL}(f_2)$ the real part of the measurement current at the second measurement frequency, $$I_{REAL}(f_1) = U_1(G_{CHOKE}(f_1) + G_X) \rightarrow G_{CHOKE}(f_1) = \frac{I_{REAL}(f_1)}{U_1} - G_X$$

$$I_{REAL}(f_2) = U_2(G_{CHOKE}(f_2) + G_X) \rightarrow G_{CHOKE}(f_2) = \frac{I_{REAL}(f_2)}{U_2} - G_X$$

Assumption: $G_{CHOKE}(f_2)=K_{REAL}(f_1,f_2)\cdot G_{CHOKE}(f_1)$, independent from temperature $$\rightarrow G_{CHOKE}(f_2) = \frac{I_{REAL}(f_2)}{U_2} - G_X = \quad (***)$$

$$K_{REAL}(f_1, f_2) \cdot G_{CHOKE}(f_1) \rightarrow G_{CHOKE}(f_1) = \frac{\frac{I_{REAL}(f_2)}{U_2} - G_X}{K_{REAL}(f_1, f_2)} =$$

$$\frac{I_{REAL}(f_1)}{U_1} - G_X \leftrightarrow \frac{\frac{I_{REAL}(f_2)}{U_2}}{K_{REAL}(f_1, f_2)} - \frac{I_{REAL}(f_1)}{U_1} =$$

$$G_X\left(\frac{1}{K_{REAL}(f_1, f_2)} - 1\right) \leftrightarrow \frac{I_{REAL}(f_2)}{U_2} -$$

$$K_{REAL}(f_1, f_2) \cdot \frac{I_{REAL}(f_1)}{U_1} = G_X(1 - K_{REAL}(f_1, f_2)) \leftrightarrow$$

$$\frac{\frac{I_{REAL}(f_2)}{U_2} - K_{REAL}(f_1, f_2) \cdot \frac{I_{REAL}(f_1)}{U_1}}{1 - K_{REAL}(f_1, f_2)} =$$

$$G_X = G_{X,COMP}$$

In case $G_X$ also depends on the measurement frequency, which is the case for seat's conductance to GND in particular, $G_{X,COMP}$ represents.

$$\frac{G_X(f_2) - G_X(f_1) \cdot K_{REAL}(f_1, f_2)}{1 - K_{REAL}(f_1, f_2)} = G_{X,COMP}$$

Above formula describes a transformation of the conductance values at two measurement frequencies $f_1$ and $f_2$ into the value $G_{X,COMP}$, which is the result after compensation of the choke's parasitic conductance.

For a dry seat, the seat's conductance value does not depend on the measurement frequency (it is virtually equal to 0 at dry condition), $G_{X,COMP}$ can be calculated to $$\frac{G_X(f_2) - G_X(f_1) \cdot K_{REAL}(f_1, f_2)}{1 - K_{REAL}(f_1, f_2)} =$$

$$\frac{G_X - G_X \cdot K_{REAL}(f_1, f_2)}{1 - K_{REAL}(f_1, f_2)} = G_X \frac{1 - K_{REAL}(f_1, f_2)}{1 - K_{REAL}(f_1, f_2)} = G_X = G_{X,COMP}$$

Only in the 'dry seat' case, the calculated conductance value $G_{X,COMP}$ is equal to the real conductance $G_X$. In case of a wet seat, $G_{X,COMP}$ represents the result of a transformation of the conductances $G_X$ at the first and the second measurement frequency.

If $K_{REAL}$ depends on the temperature, this leads to a compensation error in $G_{X,COMP}$, i.e. to an error that adds to the in the result of the described transformation. The error can be calculated as:

$$\Delta G_{X,COMP}(f_1, f_2, T) = \frac{\Delta K_{REAL}}{1 - K_{REAL}(f_1, f_2, T_{REF})} G_{CHOKE}(f_1) =$$

$$\frac{K_{REAL}(f_1, f_2, T) - K_{REAL}(f_1, f_2, T_{REF})}{1 - K_{REAL}(f_1, f_2, T_{REF})} G_{CHOKE}(f_1)$$

where $\Delta G_{X,COMP}(f_1, f_2, T)$ represents the compensation error due to temperature dependency of $K_{REAL}$.

A combined heating and seat occupant sensing system according to embodiment 2 (the common mode choke of which satisfies condition a)) is typically configured to measure the real and the imaginary part of the alternating current I at the first measurement frequency and the real and the imaginary part of alternating current I at the second measurement frequency. The capacitive sensing circuit then computes $C_{X,COMP}$ or $C_X$ using formula (*) or (). $G_{X,COMP}$ is computed using formula (*). The decision unit then compares $C_{X,COMP}$ or $C_X$ with a threshold $C_{TH}(G_{X,COMP})$. If $C_{X,COMP}$ or $C_X > C_{TH}(G_{X,COMP})$, than the seat is deemed occupied (by a 5% female or a heavier occupant). If $C_{X,COMP}$ or $C_X < C_{TH}$, than the seat is deemed not occupied (or occupied by a child seat). The capacitive sensing circuit is preferably implemented as an ASIC, a FPGA, a microcontroller or the like.

Example 1

An example of a magnetic core (for the common mode choke) which meets the requirements concerning conductance and inductance curve over frequency for K-compensation (conditions a) and b)) is the following:
Core type: W409 from company: Vacuumschmelze (Germany); Number of windings per coil: 14.

In the following, $f_1$=300 kHz, $f_2$=400 kHz. With this common mode choke:

$$K_{IMAG}(f_1=300 \text{ kHz}, f_2=400 \text{ kHz}, T_{REF}=25° \text{ C.})=0.8618$$

$$K_{REAL}(f_1=300 \text{ kHz}, f_2=400 \text{ kHz}, T_{REF}=25° \text{ C.})=0.9005$$

$$-0.77\% \leq \frac{[K_{IMAG}(f_1, f_2, T) - K_{IMAG}(f_1, f_2, T_{REF})]}{K_{IMAG}(f_1, f_2, T_{REF})} \leq 0.51\%$$

in the temperature range from −40° C. to +150° C.

$$-0.06\% \leq \frac{[K_{REAL}(f_1, f_2, T) - K_{REAL}(f_1, f_2, T_{REF})]}{K_{REAL}(f_1, f_2, T_{REF})} \leq 0.42\%$$

in the temperature range from −40° C. to +150° C.

In this example, which combines embodiments 1 and 3 above, the capacitive sensing circuit computes $C_{X,COMP}$ using formula (*). $G_{X,COMP}$ is computed using formula (***). The decision unit compares $C_{X,COMP}$ with a threshold $C_{TH}(G_{X,COMP})$. If $C_{X,COMP} > C_{TH}(G_{X,COMP})$, than the seat is deemed occupied (by a 5% female or a heavier occupant). If $C_{X,COMP} < C_{TH}$, than the seat is deemed not occupied (or occupied by a child seat).

Figure 9:
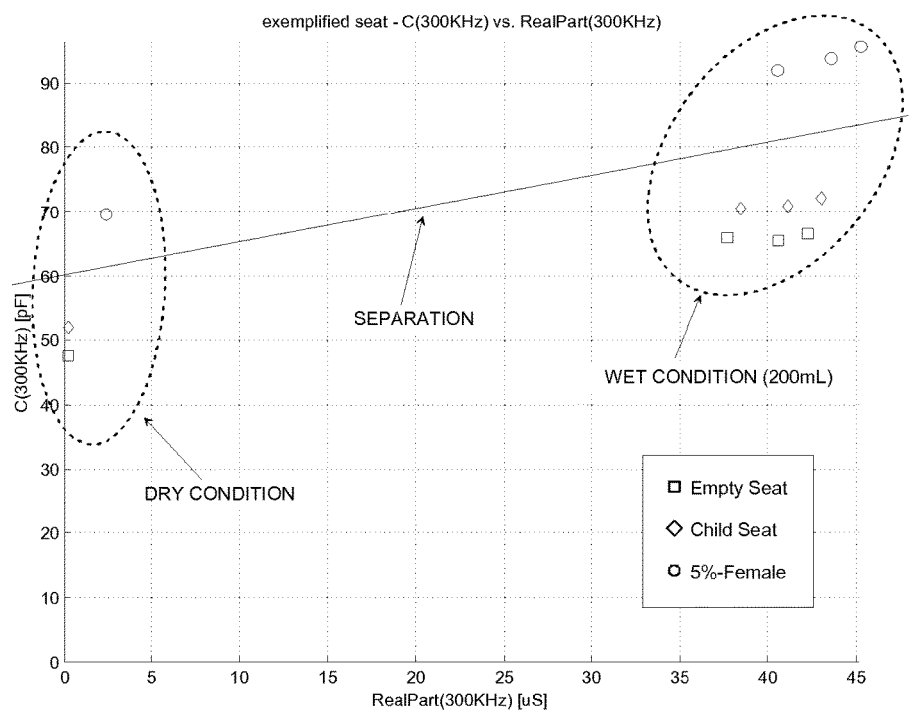
FIG. 9 illustrates the separation between 'EmptySeat/CRS' and 5%-Female exemplified passenger seat for the measurement frequency of 300 kHz in dry and wet condition (200 mL water sprayed on seat)
Figure 10:
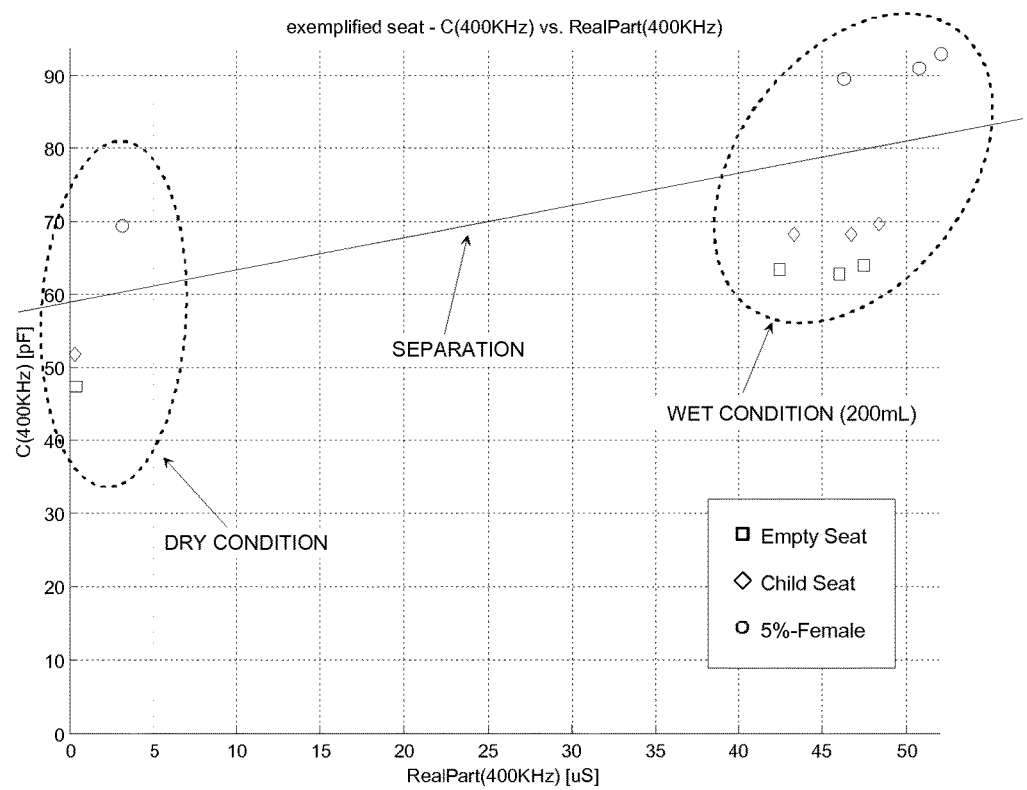
FIG. 10 illustrates the separation between 'EmptySeat/CRS' and 5%-Female exemplified passenger seat for the measurement frequency of 400 kHz in dry and wet condition (200 mL water sprayed on seat)

FIGS. 9 and 10 show the separation between 5%-Female and EmptySeat/CRS for an exemplified passenger seat for two measurement frequencies (300 kHz and 400 kHz) in dry and wet condition (200 mL water sprayed on seat). A clear distinction between EmptySeat/CRS and 5%-Female can be drawn by the capacitive measurement result if the real part of the complex admittance is taken to adapt the threshold for decision.

Figure 11:
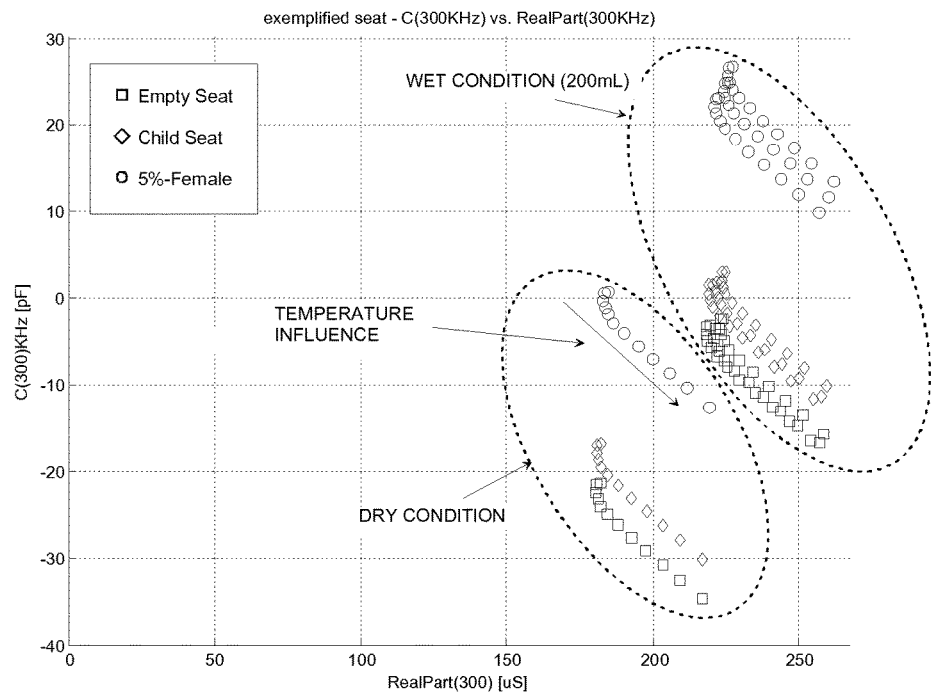
FIG. 11 shows the result of the measurement performed at 300 kHz over temperature with a system using the choke of example 1, when no compensation of the choke's inductance and conductance according to embodiments 1 and 3 is performed.
Figure 12:
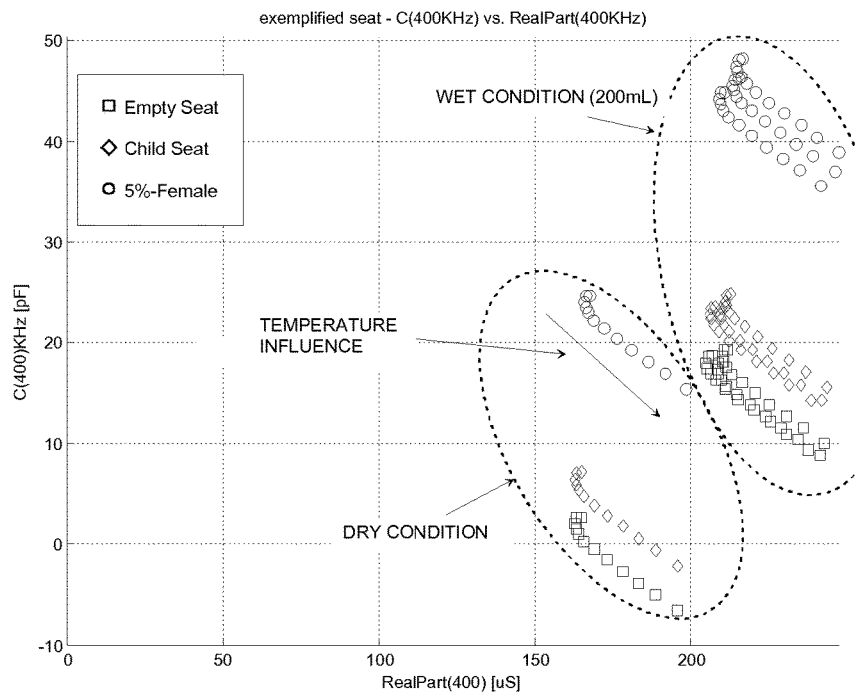
FIG. 12 shows the result of the measurement performed at 400 kHz over temperature with a system using the choke of example 1, when no compensation of the choke's inductance and conductance according to embodiments 1 and 3 is performed.

FIGS. 11 and 12 show the result of the measurement performed at 300 kHz and 400 kHz over temperature with a system using the choke described above, in case where no compensation of the choke's inductance and conductance according to embodiments 1 and 3 is performed (i.e. if the inductance and the conductance of the common mode choke are considered not depending on temperature). In direct comparison to FIGS. 10 and 11, which show the target values to be determined at both frequencies, it's obvious that the impact of the coil cannot be neglected for the determined capacitive value and the real part of the complex admittance.

The measured real part is dominated by the parasitic conductance of the coil. The temperature drift of the coil's parameters (inductance and conductance) lead to a drift of the determined capacitive (y-axis) and conductance (x-axis) value. It follows that a reliable discrimination between EmptySeat/CRS (empty seat) and 5% female (occupied seat) cannot be made without compensating the temperature dependency of the common mode choke.

Figure 13:
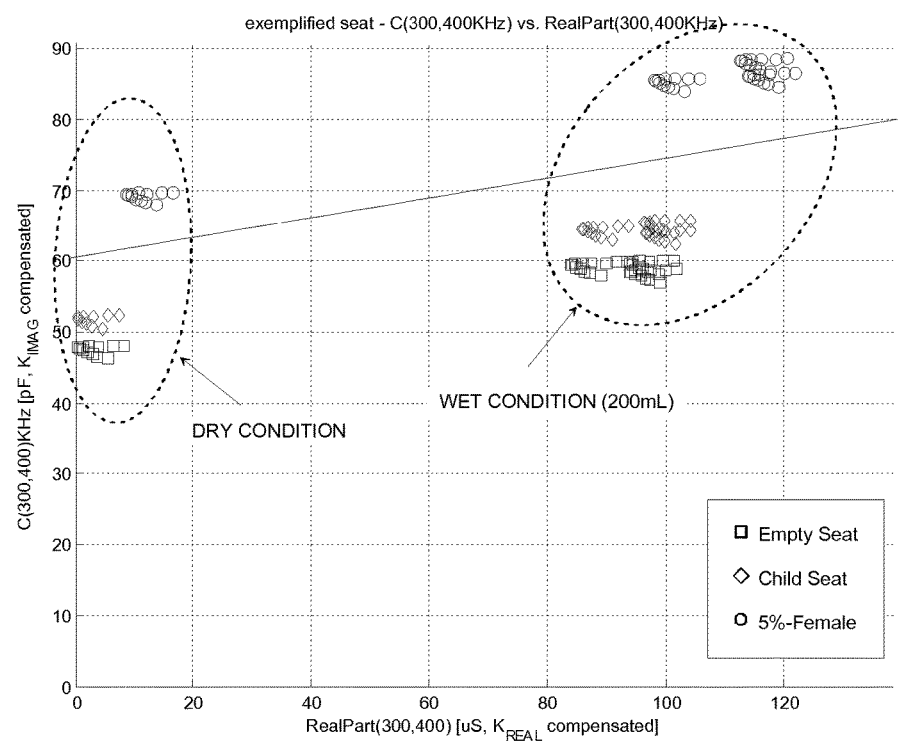
FIG. 13 shows the result of the compensation according to embodiments 1 and 3 on the separation between EmptySeat/CRS and 5% female, obtained using the common mode choke of example 1.

Applying formulas (\*) and (\*\*\*) leads to the result documented in FIG. 13. It shows that $C_{X,COMP}$ and $G_{X,COMP}$ allow a good separation between EmptySeat/CRS and 5% female. The residual temperature drift of $C_{X,COMP}$ and $G_{X,COMP}$ can be neglected, as it does not affect the separation.

In this particular example, the considered temperature range for the choke's core was −40° C. to +150° C. Over this temperature range, $K_{IMAG}$ varies from −0.77% to 0.51% with respect to reference value for $K_{IMAG}$ determined at room temperature (here 25° C.). $K_{REAL}$ varies from −0.06% to 0.42% with respect to reference value for $K_{REAL}$ determined at room temperature.

Comparable result can be achieved by using the magnetic core W380 instead of W409 for the common mode choke.

Comparative Example 1

Core type: MA055 from company: JFe; Number of windings per coil: 14.

In the following, $f_1$=300 kHz, $f_2$=400 kHz. With this common mode choke:

$$K_{IMAG}(f_1=300\ \text{kHz}, f_2=400\ \text{kHz}, T_{REF}=25°\ \text{C.})=1.1857$$

$$K_{REAL}(f_1=300\ \text{kHz}, f_2=400\ \text{kHz}, T_{REF}=25°\ \text{C.})=1.1565$$

$$-8.7\% \leq \frac{[K_{IMAG}(f_1, f_2, T) - K_{IMAG}(f_1, f_2, T_{REF})]}{K_{IMAG}(f_1, f_2, T_{REF})} \leq 4.2\%$$

in the temperature range from −40° C. to +150° C.

$$-12.3\% \leq \frac{[K_{REAL}(f_1, f_2, T) - K_{REAL}(f_1, f_2, T_{REF})]}{K_{REAL}(f_1, f_2, T_{REF})} \leq 15.5\%$$

in the temperature range from −40° C. to +150° C.

Figure 14:
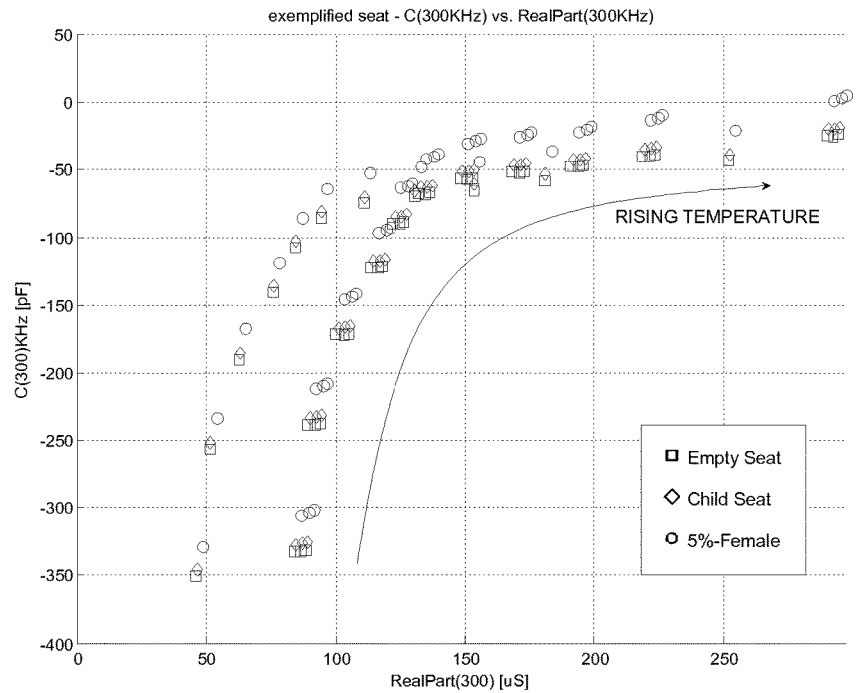
FIG. 14 shows the separation between 5%-Female and EmptySeat/CRS for a passenger seat for the measurement frequency of 300 kHz in dry and wet condition (200 mL sprayed water) using the choke of comparative example 1.
Figure 15:
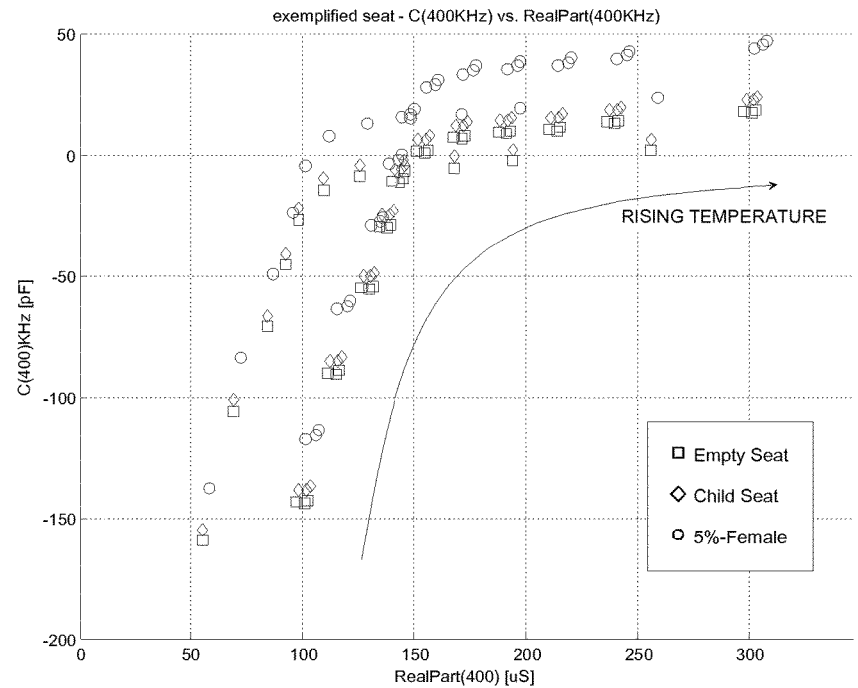
FIG. 15 shows the separation between 5%-Female and EmptySeat/CRS for a passenger seat for the measurement frequency of 400 kHz in dry and wet condition (200 mL sprayed water) using the choke of comparative example 1.
Figure 16:
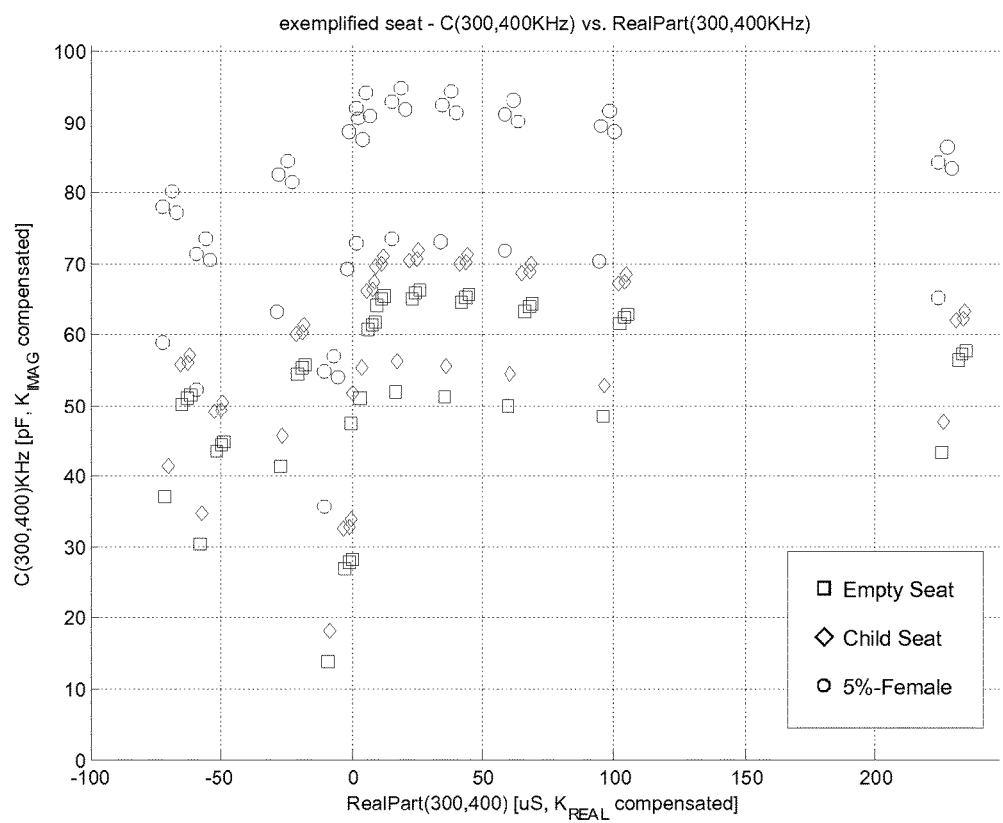
FIG. 16 shows the result of the compensation according to embodiments 1 and 3 on the separation between EmptySeat/CRS and 5% female, obtained using the common mode choke of comparative example 1.

An example for the case where the described compensation of the choke's inductance and conductance does not work is shown in FIGS. 14 to 16. For this comparative example, all circumstances were the same as for example 1, except for the common mode choke.

FIGS. 14 and 15 show the separation between 5%-Female and EmptySeat/CRS for a passenger seat for two measurement frequencies (300 kHz and 400 kHz) und dry and wet condition (200 mL sprayed water). A clear distinction between EmptySeat/CRS and 5%-Female cannot be made if the temperature varies, even if formulas (\*) and (\*\*\*) are applied (FIG. 16). The reason for this is that $K_{IMAG}(f_1,f_2)$ and $K_{REAL}(f_1,f_2)$ vary heavily over temperature, in contrast to the case where core W409 is used.

Example 2

An example of a magnetic core (for the common mode choke) which meets conditions a) and c) is the following: Core type: W409 from company: Vacuumschmelze (Germany); Number of windings per coil: 14.

In the following, $f_1$=300 kHz, $f_2$=400 kHz. With this common mode choke:

$$\Delta L(f_1=300\ \text{kHz}, f_2=400\ \text{kHz}, T_{REF}=25°\ \text{C.})=-1.1598\ mH$$

$$K_{REAL}(f_1=300\ \text{kHz}, f_2=400\ \text{kHz}, T_{REF}=25°\ \text{C.})=0.9005$$

$$-4.2\% \leq \frac{[\Delta L(f_1, f_2, T) - \Delta L(f_1, f_2, T_{REF})]}{\Delta L(f_1, f_2, T_{REF})} \leq 5.6\%$$

in the temperature range from −40° C. to +125° C.

$$-0.06\% \leq \frac{[K_{REAL}(f_1, f_2, T) - K_{REAL}(f_1, f_2, T_{REF})]}{K_{REAL}(f_1, f_2, T_{REF})} \leq 0.42\%$$

in the temperature range from −40° C. to +125° C.

Figure 17:
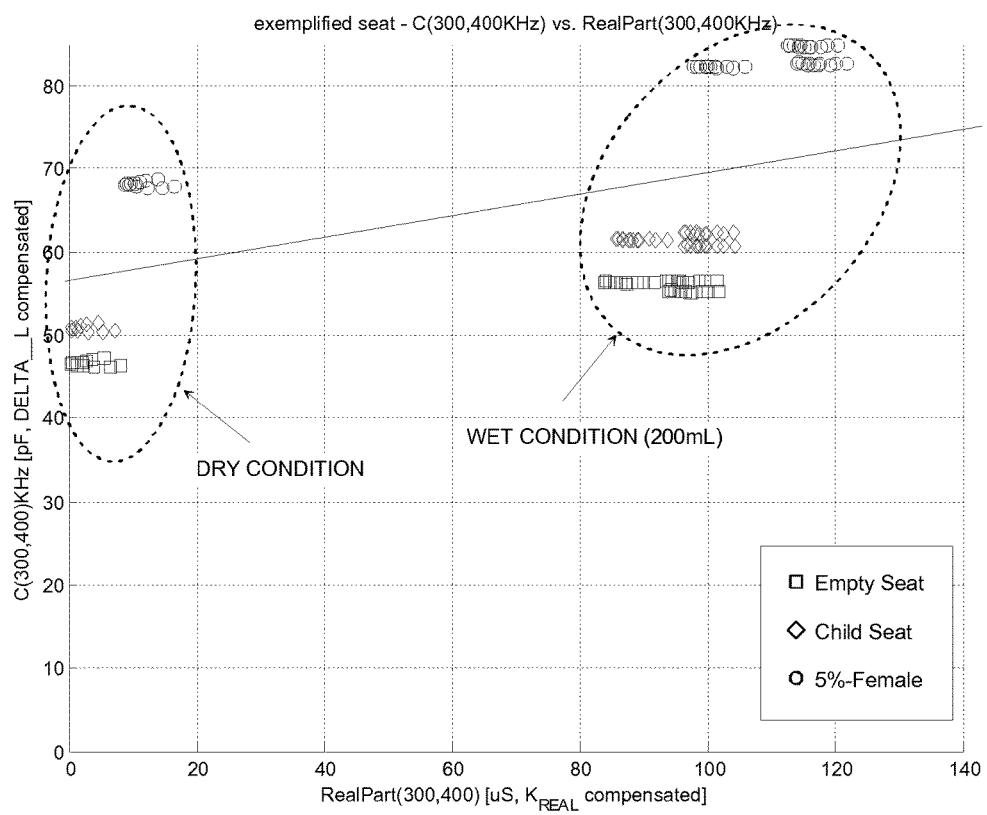
FIG. 17 shows the result of the compensation according to embodiments 1 and 3 on the separation between EmptySeat/CRS and 5% female, obtained using the common mode choke of example 2.

In this example, which combines embodiments 2 and 3 above, the capacitive sensing circuit computes $C_X$ using formula (\*\*). $G_{X,COMP}$ is computed using formula (\*\*\*). The decision unit compares $C_X$ with a threshold $C_{TH}(G_{X,COMP})$. If $C_X > C_{TH}(G_{X,COMP})$, than the seat is deemed occupied (by a 5% female or a heavier occupant). If $C_X < C_{TH}$, than the seat is deemed not occupied (or occupied by a child seat). The resulting separation is shown in FIG. 17. The temperature drift of the calculated values can be neglected, as it does not affect the separation anymore.

Comparative Example 2

Core type: MA055 from company: JFe; Number of windings per coil: 14.

In the following, $f_1$=300 kHz, $f_2$=400 kHz. With this common mode choke:

$$\Delta L(f_1=300\ \text{kHz}, f_2=400\ \text{kHz}, T_{REF}=25°\ \text{C.})=0.3361\ mH$$

$$K_{REAL}(f_1=300\ \text{kHz}, f_2=400\ \text{kHz}, T_{REF}=25°\ \text{C.})=1.1565$$

$$-82.5\% \leq \frac{[\Delta L(f_1, f_2, T) - \Delta L(f_1, f_2, T_{REF})]}{\Delta L(f_1, f_2, T_{REF})} \leq 64.2\%$$

in the temperature range from −40° C. to +125° C.

$$-12.3\% \leq \frac{[K_{REAL}(f_1, f_2, T) - K_{REAL}(f_1, f_2, T_{REF})]}{K_{REAL}(f_1, f_2, T_{REF})} \leq 15.5\%$$

in the temperature range from −40° C. to +125° C.

Figure 18:
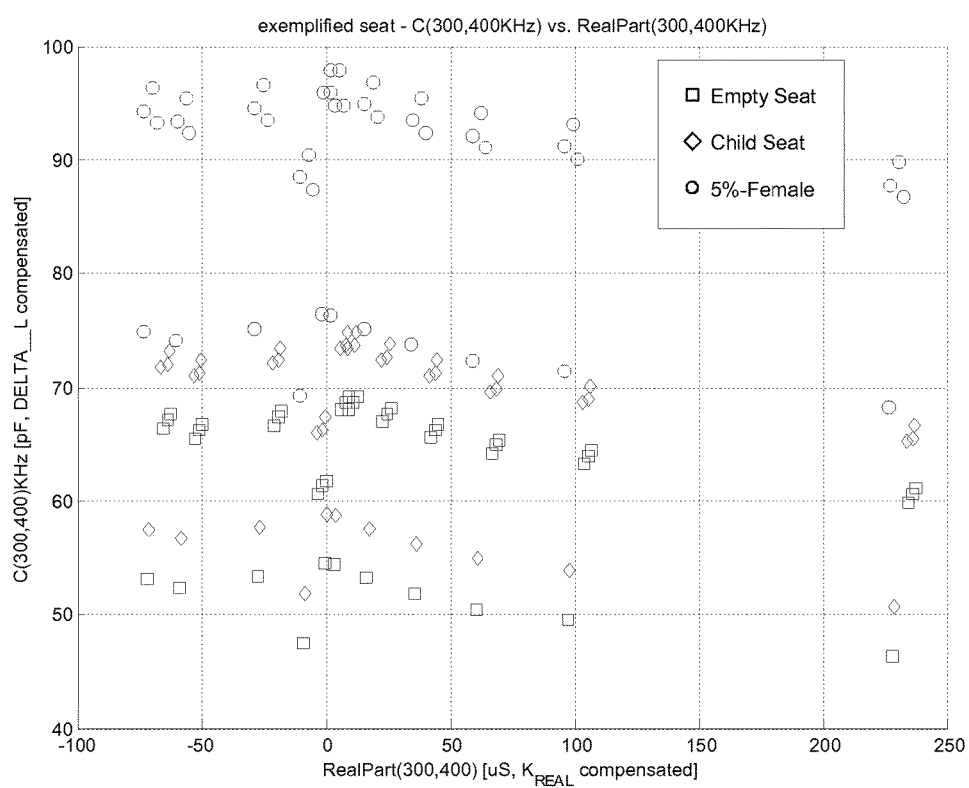
FIG. 18 shows the result of the compensation according to embodiments 1 and 3 on the separation between EmptySeat/CRS and 5% female, obtained using the common mode choke of comparative example 2.

In this comparative example, $C_X$ is computed using formula (\*\*). $G_{X,COMP}$ is computed using formula (\*\*\*). Nevertheless, as illustrated in FIG. 18, no clear separation between an empty seat (or a seat occupied by a CRS) and a seat occupied by a 5%-Female or heavier person, can be made.

Figure 19:
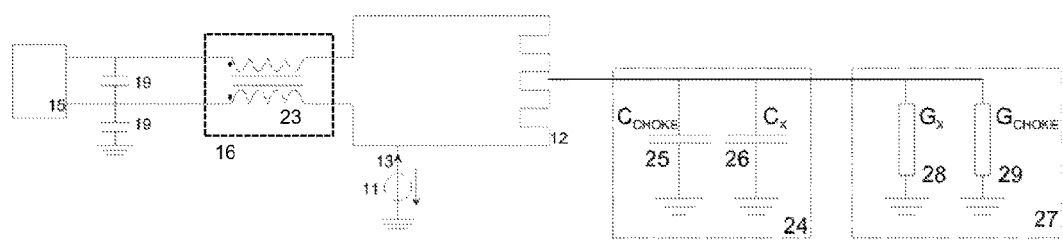
FIG. 19 is a schematic illustration of a capacitive sensing system according to the present invention.

While specific embodiments and examples have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

FIG. 19 shows a schematic illustration of a capacitive sensing system according to the present invention using the seat heater as sensing element 12, wherein the heating current supply 15 is AC-decoupled from the heating element 12 by a common mode choke 16.

The invention claimed is:

1. A combined heating and capacitive seat occupant sensing system, comprising:
   a heating element configured to produce heat when an electrical current is caused to flow across the heating element, said heating element comprising DC-coupling terminals structured for coupling said heating element to a heating current supply;
   a capacitive sensing circuit connected to said heating element, wherein the heating element is structured to be used as an antenna electrode, said capacitive sensing circuit comprising:
   a voltage source configured for driving a first alternating current at a first frequency $f_1$ into said heating element and a second alternating current at a second frequency $f_2$ into said heating element; and
   a common mode choke connected to the DC-coupling terminals of said heating element and configured to suppress alternating current flow between said heating element and said heating current supply;
   wherein said first frequency $f_1$ and said second frequency $f_2$ are comprised in a range from 50 kHz to 10 MHz, with said first frequency $f_1$ and said second frequency $f_2$ spaced from each other by at least 10 kHz,
   wherein said common mode choke is configured to satisfy at least one of the following operating conditions:
   a) $-5\% \leq [K_{REAL}(f_1,f_2,T) - K_{REAL}(f_1,f_2,T_{REF})]/K_{REAL}(f_1,f_2,T_{REF}) \leq 5\%$, for any temperature T in a range from $-40°$ C. to $+150°$ C.,
   where $T_{REF}=25°$ C. and where a function $K_{REAL}(f_x,f_y,T)$ is defined as a ratio $G(f_y,T)/G(f_x,T)$, where $G(f_x,T)$ and $G(f_y,T)$ is a conductance, at temperature T, of the common mode choke at the frequencies $f_x$ and $f_y$, respectively;
   b) $-3\% \leq [K_{IMAG}(f_1,f_2,T) - K_{IMAG}(f_1,f_2,T_{REF})]/K_{IMAG}(f_1,f_2,T_{REF}) \leq 3\%$, for any temperature T in a range from $-40°$ C. to $+150°$ C.,
   where $T_{REF}=25°$ C. and where a function $K_{IMAG}(f_x,f_y,T)$ is defined as a ratio $L(f_y,T)/L(f_x,T)$, where $L(f_x,T)$ and $L(f_y,T)$ is an inductance, at temperature T, of the common mode choke at the frequencies $f_x$ and $f_y$, respectively; or
   c) $-20\% \leq [\Delta L(f_1,f_2,T) - \Delta L(f_1,f_2,T_{REF})]/\Delta L(f_1,f_2,T_{REF}) \leq 20\%$, for any temperature T in a range from $-40°$ C. to $+150°$ C.,
   where $T_{REF}=25°$ C. and where the function $\Delta L(f_x,f_y,T)$ is defined as a difference $L(f_y,T)-L(f_x,T)$, where $L(f_x,T)$ and $L(f_y,T)$ is the inductance, at a temperature T, of the common mode choke at the frequencies $f_x$ and $f_y$, respectively;
   and wherein the capacitive sensing circuit is configured to calculate a capacitance associated with the antenna electrode and to determine whether a seat occupant is present or not based on the capacitance, wherein the capacitive sensing circuit calculates the capacitance based on at least one of a real part and an imaginary part of measured values for said first alternating current and said second alternating current and at least one of the inductance and the conductance of the common mode choke relating to the functions for $K_{REAL}$, $K_{IMAG}$, and $\Delta L$, each of which are temperature independent functions when the common mode choke satisfies, respectively, at least one of operating conditions a), b), and c), wherein the calculated capacitance compensates for residual alternating currents introduced to the antenna electrode by the common mode choke.

2. The combined heating and capacitive seat occupant sensing system B as claimed in claim 1, wherein at least one of said frequencies is selected in a range from 50 kHz to 400 kHz.

3. The combined heating and capacitive seat occupant sensing system as claimed in claim 1, wherein said common mode choke is configured to satisfy at least condition a).

4. The combined heating and capacitive seat occupant sensing system as claimed in claim 3, wherein said common mode choke is configured to satisfy $-2\% \leq [K_{REAL}(f_1,f_2,T) - K_{REAL}(f_1,f_2,T_{REF})]/K_{REAL}(f_1,f_2,T_{REF}) \leq 2\%$, for any temperature T in the range from $-40°$ C. to $+150°$ C.

5. The combined heating and capacitive seat occupant sensing system as claimed in claim 3, wherein said common mode choke is configured to further satisfy condition b).

6. The combined heating and capacitive seat occupant sensing system as claimed in claim 1, wherein said common mode choke is configured to also satisfy condition $-2\% \leq [K_{IMAG}(f_1,f_2,T) - K_{IMAG}(f_1,f_2,T_{REF})]/K_{IMAG}(f_1,f_2,T_{REF}) \leq 2\%$, for any temperature T in the range from $-40°$ C. to $+150°$ C.

7. The combined heating and capacitive seat occupant sensing system as claimed in claim 3, wherein said common mode choke is configured to also satisfy condition c).

8. The combined heating and capacitive seat occupant sensing system as claimed in claim 1, wherein said common mode choke is configured to also satisfy condition $-10\% \leq [\Delta L(f_1,f_2,T) - \Delta L(f_1,f_2,T_{REF})]/\Delta L(f_1,f_2,T_{REF}) \leq 10\%$, for any temperature T in the range from $-40°$ C. to $+150°$ C.

9. The combined heating and capacitive seat occupant sensing system as claimed in claim 1, comprising a heating current supply DC-coupled to said heating element via said common mode choke.

10. A vehicle seat comprising the combined heating and capacitive seat occupant sensing system as claimed in claim 1.

11. A combined heating and capacitive seat occupant sensing system, comprising:
   a heating element delivering heat upon flow of an electrical current across the heating element, said heating element comprising DC-coupling terminals structured for DC-coupling said heating element to a heating current supply;
   a capacitive sensing circuit connected to said heating element for using said heating element as an antenna electrode, said capacitive sensing circuit comprising
   a voltage source configured for driving a first alternating current at a first frequency $f_1$ into said heating element and a second alternating current at a second frequency $f_2$ into said heating element; and
   a common mode choke connected to the DC-coupling terminals of said heating element and configured to mitigate alternating current flow between said heating element and said heating current supply;
   wherein said first frequency $f_1$ and said second frequency $f_2$ are comprised in a range from 50 kHz to 10 MHz, with said first frequency $f_1$ and said second frequency $f_2$ spaced from each other by at least 10 kHz,
   wherein said common mode choke is configured to satisfy at least one of the following operating conditions:

a) $-5\% \leq [K_{REAL}(f_1,f_2,T)-K_{REAL}(f_1,f_2,T_{REF})]/K_{REAL}(f_1,f_2,T_{REF}) \leq 5\%$, for any temperature T in a range from $-40°$ C. to $+150°$ C., where $T_{REF}=25°$ C. and where a function $K_{REAL}(f_x,f_y,T)$ is defined as a ratio $G(f_y,T)/G(f_x,T)$, where $G(f_x,T)$ and $G(f_y,T)$ is a conductance, at temperature T, of the common mode choke at the frequencies $f_x$ and $f_y$, respectively;

b) $-3\% \leq [K_{IMAG}(f_1,f_2,T)-K_{IMAG}(f_1,f_2,T_{REF})]/K_{IMAG}(f_1,f_2,T_{REF}) \leq 3\%$, for any temperature T in a range from $-40°$ C. to $+150°$ C., where $T_{REF}=25°$ C. and where a function $K_{IMAG}(f_x,f_y,T)$ is defined as a ratio $L(f_y,T)/L(f_x,T)$, where $L(f_x,T)$ and $L(f_y,T)$ is an inductance, at temperature T, of the common mode choke at the frequencies $f_x$ and $f_y$, respectively; or c) $-20\% \leq [\Delta L(f_1,f_2,T_{REF})-\Delta L(f_1,f_2,T_{REF})]/\Delta L(f_1,f_2,T_{REF}) \leq 20\%$, for any temperature T in a range from $-40°$ C. to $+150°$ C., where $T_{REF}=25°$ C. and where a function $\Delta L(f_x,f_y,T)$ is defined as a difference $L(f_y,T)-L(f_x,T)$, where $L(f_x,T)$ and $L(f_y,T)$ is the inductance, at a temperature T, of the common mode choke at the frequencies $f_x$ and $f_y$, respectively;

wherein at least one of said first frequency $f_1$ and said second frequency $f_2$ is selected in the range from 50 kHz to 400 kHz; and wherein the capacitive sensing circuit is configured to calculate a capacitance associated with the antenna electrode and to determine whether a seat occupant is present or not based on the capacitance, wherein the capacitive sensing circuit calculates the capacitance based on at least one of a real part and an imaginary part of measured values of said first alternating current and said second alternating current and at least one of the inductance and the conductance of the common mode choke relating to the functions for $K_{REAL}$, $K_{IMAG}$, and $\Delta L$, each of which are temperature independent functions when the common mode choke satisfies, respectively, at least one of operating conditions a), b), and c), wherein the calculated capacitance compensates for residual alternating currents introduced to the antenna electrode by said common mode choke.

12. The combined heating and capacitive seat occupant sensing system as claimed in claim 11, wherein said common mode choke is configured to satisfy at least condition a).

13. The combined heating and capacitive seat occupant sensing system as claimed in claim 12, wherein said common mode choke is configured to satisfy $-2\% \leq [K_{REAL}(f_1,f_2,T)-K_{REAL}(f_1,f_2,T_{REF})]/K_{REAL}(f_1,f_2,T_{REF}) \leq 2\%$, for any temperature T in the range from $-40°$ C. to $+150°$ C.

14. The combined heating and capacitive seat occupant sensing system as claimed in claim 13, wherein said common mode choke is configured to also satisfy condition b).

15. The combined heating and capacitive seat occupant sensing system as claimed in claim 11, wherein said common mode choke is configured to also satisfy condition $-2\% \leq [K_{IMAG}(f_1,f_2,T)-K_{IMAG}(f_1,f_2,T_{REF})]/K_{IMAG}(f_1,f_2,T_{REF}) \leq 2\%$, for any temperature T in the range from $-40°$ C. to $+150°$ C.

16. The combined heating and capacitive seat occupant sensing system as claimed in claim 13, wherein said common mode choke is configured to also satisfy condition c).

17. The combined heating and capacitive seat occupant sensing system as claimed in claim 11, wherein said common mode choke is configured to also satisfy condition $-10\% \leq [\Delta L(f_1,f_2,T)-\Delta L(f_1,f_2,T_{REF})]/\Delta L(f_1,f_2,T_{REF}) \leq 10\%$, for any temperature T in the range from $-40°$ C. to $+150°$ C.

18. The combined heating and capacitive seat occupant sensing system as claimed in claim 11, comprising a heating current supply DC-coupled to said heating element via said common mode choke.

* * * * *